(12) United States Patent
Tsirkin et al.

(10) Patent No.: US 11,748,136 B2
(45) Date of Patent: Sep. 5, 2023

(54) EVENT NOTIFICATION SUPPORT FOR NESTED VIRTUAL MACHINES

(71) Applicant: Red Hat, Inc., Raleigh, NC (US)

(72) Inventors: Michael Tsirkin, Lexington, MA (US); Karen Lee Noel, Westford, MA (US)

(73) Assignee: Red Hat, Inc., Raleigh, NC (US)

( * ) Notice: Subject to any disclaimer, the term of this patent is extended or adjusted under 35 U.S.C. 154(b) by 392 days.

(21) Appl. No.: 16/943,636

(22) Filed: Jul. 30, 2020

(65) Prior Publication Data
US 2022/0035649 A1 Feb. 3, 2022

(51) Int. Cl.
G06F 9/455 (2018.01)
G06F 9/54 (2006.01)
G06F 9/30 (2018.01)
G06F 12/1009 (2016.01)
G06F 12/0802 (2016.01)

(52) U.S. Cl.
CPC ...... *G06F 9/45558* (2013.01); *G06F 9/30101* (2013.01); *G06F 9/542* (2013.01); *G06F 12/0802* (2013.01); *G06F 12/1009* (2013.01); *G06F 2009/45566* (2013.01); *G06F 2009/45579* (2013.01); *G06F 2009/45583* (2013.01); *G06F 2212/151* (2013.01)

(58) Field of Classification Search
CPC .. G06F 9/45558; G06F 9/542; G06F 12/1009; G06F 2009/45566; G06F 2009/45579; G06F 2009/45583; G06F 2212/151; G06F 9/30101; G06F 9/0802
See application file for complete search history.

(56) References Cited

U.S. PATENT DOCUMENTS 4,253,145 A * 2/1981 Goldberg ............ G06F 9/45558
703/21
9,384,024 B2 7/2016 Ramakrishnan Nair
10,228,981 B2 3/2019 Kakaiya et al.
(Continued)

OTHER PUBLICATIONS

Laurea, "Towards Wire-Speed Network Monitoring Using Virtual Machines", University of Pisa Faculty of Mathematical, Physical and Natural Sciences, 2009-2010, 106 pages http://luca.ntop.org/Teaching/Cardigliano.pdf.
(Continued)

*Primary Examiner* — Emerson C Puente
*Assistant Examiner* — Jonathan R Labud
(74) *Attorney, Agent, or Firm* — Lowenstein Sandler LLP

(57) ABSTRACT

Systems and methods for event notification support for nested virtual machines. An example method may comprise running, by a host computer system, a Level 0 hypervisor managing a Level 1 virtual machine running a Level 1 hypervisor, wherein the Level 1 hypervisor manages a Level 2 virtual machine. The Level 1 hypervisor may generate a virtual device and an input/output (I/O) translation table comprising an I/O translation table entry associated with the virtual device, and associate the I/O translation table entry with a Level 1 virtual machine context maintained by at least one of the Level 0 hypervisor or Level 1 hypervisor. The method may further responsive to detecting, by the Level 0 hypervisor, an event notification from the Level 2 virtual machine, cause a central processing unit (CPU) to use the I/O translation table to execute access to the Level 1 guest virtual address.

17 Claims, 6 Drawing Sheets

(56) References Cited

U.S. PATENT DOCUMENTS

| | | |
|---|---|---|
| 10,467,033 B2 | 11/2019 | Tian et al. |
| 2005/0039180 A1* | 2/2005 | Fultheim ............ G06F 9/45533 718/1 |
| 2011/0153909 A1* | 6/2011 | Dong ................ G06F 9/45558 711/6 |
| 2016/0292075 A1* | 10/2016 | Mohan ............... G06F 12/1036 |
| 2017/0262306 A1* | 9/2017 | Wang .................... G06F 9/5027 |
| 2019/0107965 A1 | 4/2019 | Deval et al. |
| 2019/0155630 A1 | 5/2019 | Zhu et al. |

OTHER PUBLICATIONS

Ben-Yehuda et al., "The Turtles Project: Design and Implementation of Nested Virtualization", IBM Research—Haifa; IBM Linux Technology Center, 14 pages https://www.usenix.org/legacy/event/osdi10/tech/full_papers/Ben-Yehuda.pdf.

Lim et al., "NEVE: Nested Virtualization Extensions for ARM2", Columbia University; ARM Ltd, 2017, 17 pages https://www.cs.columbia.edu/~nieh/pubs/sosp2017_neve.pdf.

* cited by examiner

EVENT NOTIFICATION SUPPORT FOR NESTED VIRTUAL MACHINES

TECHNICAL FIELD

The present disclosure is generally related to virtualized computer systems, and more particularly, to event notification support for nested virtual machines.

BACKGROUND

Virtualization herein shall refer to abstraction of some physical components into logical objects in order to allow running various software modules, for example, multiple operating systems, concurrently and in isolation from other software modules, on one or more interconnected physical computer systems. Virtualization allows, for example, consolidating multiple physical servers into one physical server running multiple virtual machines in order to improve the hardware utilization rate.

Virtualization may be achieved by running a software layer, often referred to as "hypervisor," above the hardware and below the virtual machines. A hypervisor may run directly on the server hardware without an operating system beneath it or as an application running under a traditional operating system. A hypervisor may abstract the physical layer and present this abstraction to virtual machines to use, by providing interfaces between the underlying hardware and virtual devices of virtual machines.

Processor virtualization may be implemented by the hypervisor scheduling time slots on one or more physical processors for a virtual machine, rather than a virtual machine actually having a dedicated physical processor. Memory virtualization may be implemented by employing a page table (PT) which is a memory structure translating virtual memory addresses to physical memory addresses. Device and input/output (I/O) virtualization involves managing the routing of I/O requests between virtual devices and the shared physical hardware.

BRIEF DESCRIPTION OF THE DRAWINGS

The present disclosure is illustrated by way of examples, and not by way of limitation, and may be more fully understood with references to the following detailed description when considered in connection with the figures, in which:

FIG. 3 depicts a flow diagram of an example method for providing event notification support in a nested virtualization environment, in accordance with one or more aspects of the present disclosure;

DETAILED DESCRIPTION

Figure 1:
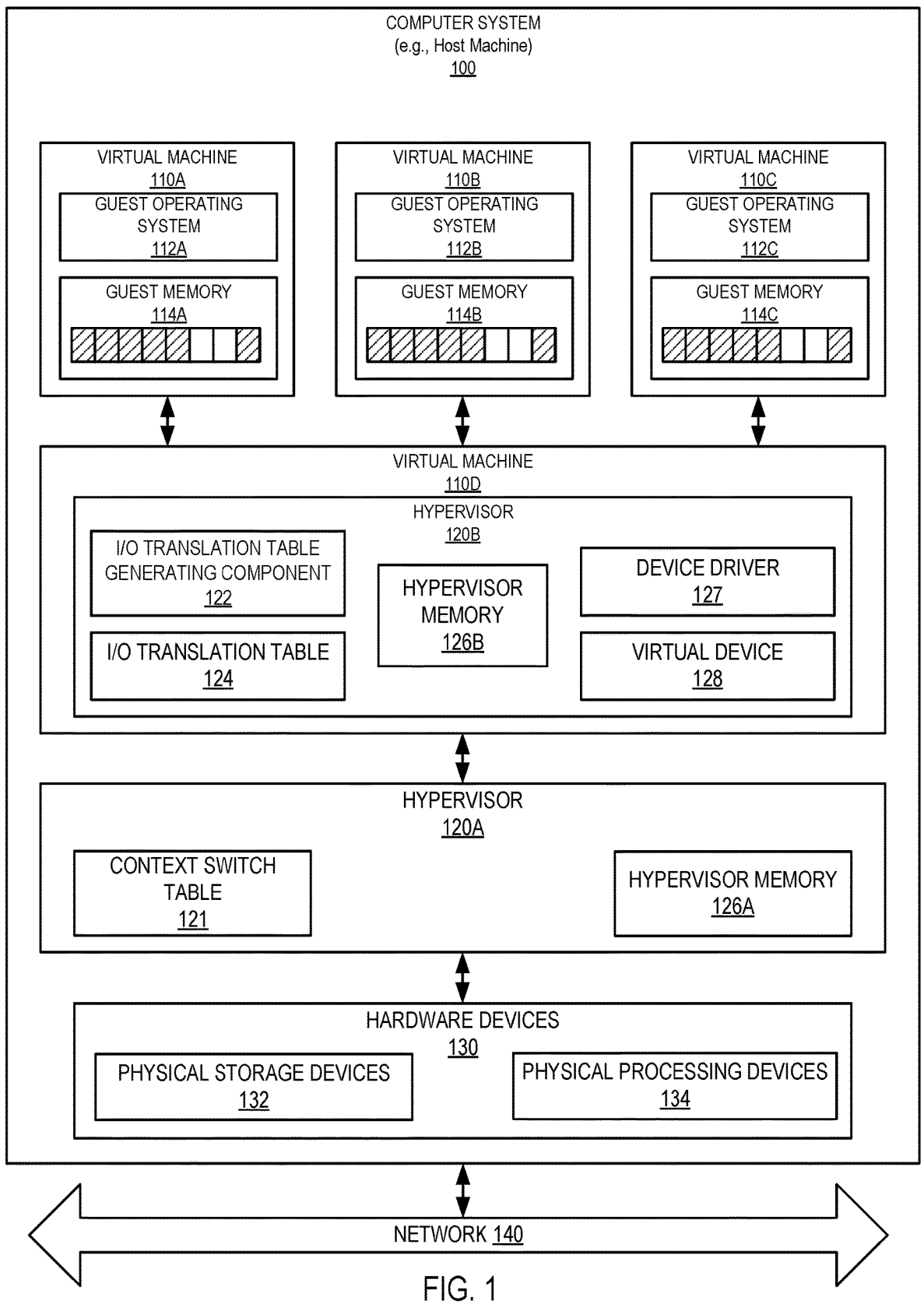
FIG. 1 depicts a high-level block diagram of an example host computer system that performs hypervisor memory management for virtual machines, in accordance with one or more aspects of the present disclosure.

Described herein are systems and methods for event notification support for nested virtual machines.

Certain processor architectures support virtualization by providing special instructions for facilitating virtual machine execution. In certain implementations, a processor may support executing a hypervisor (also referred to as "virtual machine monitor") that acts as a host and has full control of the processor and other platform hardware. A hypervisor presents a virtual machine with an abstraction of one or more virtual processors. A hypervisor is able to retain selective control of processor resources, physical memory, interrupt management, and input/output (I/O). Each virtual machine (VM) is a guest software environment that supports a stack consisting of operating system (OS) and application software. Each VM operates independently of other virtual machines and uses the same interface to the processors, memory, storage, graphics, and I/O provided by a physical platform. The software executing in a virtual machine is executed at the reduced privilege level so that the hypervisor can retain control of platform resources. A transition from the reduced privilege level (also referred to as VMX non-root operation in certain processor architectures) to the hypervisor context is referred to as a VM exit and may be triggered by a VM attempting a memory access operation to a certain memory region, by the VM attempting to execute a certain privileged instruction, or by the VM invoking a special Instruction Set Architecture (ISA)-dependent instruction (e.g., VMCALL).

A virtual device is software configurations that emulates, simulates, or otherwise mimics the behavior of a physical hardware device (e.g., a Peripheral Component Interconnect (PCI) device, a network device, etc.), but does not necessarily have associated hardware or may share hardware resources with other virtual devices. Conversely, a virtual device that is created and implemented by a hypervisor, may be exposed to a virtual machine (VM) as a pass-through device, which is exclusively associated with a physical device (e.g., a network interface card). Accordingly, communications (e.g., access requests) may be sent directly from the VM to the pass-through (virtual) device whereby the hypervisor acts as a "pass-through" for the communications. Thus, with pass-through, the VM may access the virtual device without the hypervisor trapping the communications.

To communicate (e.g., via an access request) with the virtual device, the VM may trigger a virtual machine exit (VMExit) event, such as a notification event (e.g., ioeventfd), which results in the VM temporarily exiting to the hypervisor. The notification event may be triggered in response to detecting VM access to a certain input/output (I/O) resource, e.g., a file descriptor, a socket, a port, or other input/output (I/O) resources. The hypervisor may schedule the access request to the virtual device and, subsequently, restart (e.g., by a virtual machine enter (VMEnter) instruction) the VM. This process, however, may not function well in nested virtualization.

Nested virtualization refers to virtualization that runs inside an already virtualized environment. In nested virtualization, a first hypervisor (hereafter "Level 0 hypervisor") controls physical hardware resources (e.g., bare metal). One or more second hypervisors (hereafter "Level 1 hypervisor") may run as virtual machine(s) managed by the Level 0 hypervisor. Each Level 1 hypervisor may run its own set of VMs. These VMs can be referred to as Level 2 VMs. Each level indicates a ring of privilege and access to computing resources of a computer system, where Level 0 indicates a most privileged ring within an architecture of the computer system, and incremental levels indicate less privileged rings (e.g., Level 2 is less privileged that Level 1). The Level 1 hypervisor may control execution of the Level 2 VM(s). For example, the Level 1 hypervisor may implement a firewall in software and prevent the Level 2 VM from communicating outside the Level 1 hypervisor.

In nested virtualization, a virtual device may be created and implemented by a nested hypervisor (e.g., the Level 1 hypervisor, a Level 2 hypervisor, etc.) and exposed to a VM (e.g., a Level 2 VM, a Level 3 VM running on a Level 2 hypervisor, etc.) as a pass-through device. In current technologies, when a nested VM requests access to a virtual device implemented by a nested hypervisor, the access request first requires a VMexit to the Level 0 hypervisor, whereby the Level 0 hypervisor communicates with every level of the nested virtualized environment to translate the access request. This process uses additional processing resources (e.g., central processing unit (CPU) resources) and hinders performance.

Aspects of the present disclosure address the above-noted and other deficiencies by providing technology that enhances the virtual device support in nested virtualized computer systems. In particular, aspects of the present disclosure provide technology that allows a nested VM to execute access to the nested hypervisor that implemented the virtual device. In an example, a host computer system may run a Level 0 hypervisor managing a Level 1 virtual machine running a Level 1 hypervisor, and the Level 1 hypervisor may manage a Level 2 VM. A virtual device and an I/O translation table may be generated by the Level 1 hypervisor. The I/O translation table entry may include an I/O translation table entry associated with the virtual device, which may be associated with a Level 1 VM context maintained by the Level 1 hypervisor. When the Level 2 VM requires access to the virtual device, the Level 2 VM may generate an event notification causing a VMexit, whereby the Level 0 hypervisor may cause a CPU to use the I/O translation table to execute access directly to a Level 1 guest virtual address associated with the virtual device. Accordingly, aspects of the present disclosure improve CPU usage by executing access directly to the desired nested hypervisor.

Various aspects of the above referenced methods and systems are described in details herein below by way of examples, rather than by way of limitation. The examples provided below discuss a virtualized computer system where memory movement may be initiated by aspects of a hypervisor, a host operating system, a virtual machine, or a combination thereof. In other examples, the memory movement may be performed in a non-virtualized computer system that is absent a hypervisor or other virtualization features discussed below.

FIG. 1 depicts an illustrative architecture of elements of a computer system 100, in accordance with an embodiment of the present disclosure. It should be noted that other architectures for computer system 100 are possible, and that the implementation of a computing device utilizing embodiments of the disclosure are not necessarily limited to the specific architecture depicted. Computer system 100 may be a single host machine or multiple host machines arranged in a cluster and may include a rackmount server, a workstation, a desktop computer, a notebook computer, a tablet computer, a mobile phone, a palm-sized computing device, a personal digital assistant (PDA), etc. In one example, computing device 100 may be a computing device implemented with x86 hardware. In another example, computing device 100 may be a computing device implemented with PowerPC®, SPARC®, or other hardware. In the example shown in FIG. 1, computing device 100 may include virtual machines 110A-D, hypervisors 120A-B, hardware devices 130, and a network 140.

Virtual machines 110A-D may execute guest executable code that uses an underlying emulation of the physical resources. The guest executable code may include a guest operating system, guest applications, guest device drivers, etc. Each of the virtual machines 110A-D may support hardware emulation, full virtualization, para-virtualization, operating system-level virtualization, or a combination thereof. Virtual machines 110A-D may have the same or different types of guest operating systems, such as Microsoft®, Windows®, Linux®, Solaris®, etc. Virtual machines 110A-C may execute guest operating systems 112A-C that manage guest memory 114A-C respectively. Virtual machine 110D may also execute a guest operating system that manages guest memory. Virtual machine 110D be the same or similar in all aspects to virtual machines 110A-C.

Guest memory 114A-C may be any virtual memory, logical memory, physical memory, other portion of memory, or a combination thereof for storing, organizing, or accessing data. Guest memory 114A-C may represent the portion of memory that is designated by hypervisors 120A-B for use by one or more respective virtual machines 110A-C. Guest memory 114A-C may be managed by guest operating system 112A-C and may be segmented into guest pages. The guest pages may each include a contiguous or non-contiguous sequence of bytes or bits and may have a page size that is the same or different from a memory page size used by hypervisor 120. Each of the guest page sizes may be a fixed-size, such as a particular integer value (e.g., 4 KB, 2 MB) or may be a variable-size that varies within a range of integer values.

Hypervisor memory 126A (e.g., host memory) and hypervisor memory 126B (e.g., guest memory) may be the same or similar to the guest memory but may be managed by hypervisor 120A-B, respectively, instead of a guest operating system. Hypervisor memory 126A may be segmented into host pages, and hypervisor memory 126B may be segmented into guest pages, which may be in different states. The states may correspond to unallocated memory, memory allocated to guests, and memory allocated to hypervisor(s). The unallocated memory may be host memory pages and guest memory pages that have not yet been allocated by hypervisor memory 126A-B or were previously allocated by hypervisor 120A-B and have since been deallocated (e.g., freed) by hypervisor 120A-B. The memory allocated to guests may be a portion of hypervisor memory 126A that has been allocated by hypervisor 120A to virtual machine 110D and corresponds to guest memory of virtual machine 114D, and to guest memory of hypervisor 120B, which is running on virtual machine 110D. Hypervisor 120B may allocate a portion of hypervisor memory 126B to virtual machines 110A-C, which corresponds to guest memory 114A-C. Other portions of hypervisor memory may be allocated for use by hypervisor 120A-B, a host operating system, hardware device, other module, or a combination thereof.

Hypervisor 120A may also be known as a virtual machine monitor (VMM) and may provide hypervisor 120B and virtual machines 110A-D with access to one or more features of the underlying hardware devices 130. Hypervisor 120A may be a Level 0 hypervisor, thus having the highest level of privilege within the computer system 100. In the example shown, hypervisor 120A may run directly on the hardware of computer system 100 (e.g., bare metal hypervisor). In other examples, hypervisor 120A may run on or within a host operating system (not shown). Hypervisor 120A may manage system resources, including access to hardware devices 130. In the example shown, hypervisor 120A may include context switch table 121 for context switching, and an I/O translation table 124A.

Context switching is a process of storing the state of a CPU process or CPU thread so that the CPU process or CPU thread can be restored and resume execution. In an example, a context switch may occur in response to an interrupt, such as when a virtual machine triggers a VMExit event (e.g., ioeventfd) and temporarily exits to hypervisor 120A. Responsive to the interrupt, hypervisor 120A may store virtual machine context in context switch table 121, process the interrupt, and use the context switch table 121 to restart the VM (e.g., VMEnter).

Hypervisor 120B may also be known as a virtual machine monitor (VMM) and may provide virtual machines 110A-C with access to one or more features of the underlying hardware devices 130. Hypervisor 120B may be a level 1 (Level 1) hypervisor, thus having a lower privilege than hypervisor 120A. In the example shown, hypervisor 120B may run on or within a virtual machine 110D running on hypervisor 120A. Hypervisor 120B may manage system resources provided to hypervisor 120B by virtual machine 110D or by hypervisor 120A. In the example shown, hypervisor 120B may include I/O translation table generating component 122, I/O translation table 124, device driver 127, and virtual device 128. I/O translation table generating component 122 may generate the I/O translation table 124. Device driver 127 may generate virtual device 128.

Device driver 127 may be any type of virtual or physical device driver, such as, for example, a vCPU driver. In an example, device driver 127 may be utilized for creating virtual device 128. In another example, device driver 127 may be utilized for communicating with virtual device 128 and requesting hypervisor 120B to map, to I/O translation table 124, a plurality of records referencing guest virtual addresses used by virtual machine 110A-C and associated with guest I/O port(s) of virtual device 128. The features provided by device driver 127 may be integrated into the operations performed by guest operating system 112A-C.

As noted herein above, hypervisor 120B may create a virtual device 128 and expose the virtual device 128 to virtual machines 110A-C via device driver 127. The virtual device 128 may have no associated hardware, and the functionality may be implemented by the hypervisor 120B. In an example, the virtual device 128 may be a virtual PCI device. The virtual PCI device may be assigned to one or more guest operation systems 112A-C of virtual devices 110A-C, respectively, and may communicate with the one or more guest operation systems 112A-C via device driver 127. The virtual PCI device may include DMA (direct memory access) capabilities, which allow the virtual PCI device to access system memory (e.g., physical storage devices 132) for reading and/or writing independently of a system CPU (e.g., physical processing devices 134). For example, the virtual PCI device may transfer its input/output (I/O) data directly to and from physical storage devices 132. The virtual PCI device may perform DMA using a DMA buffer. The DMA buffer may be in the address space allocated to virtual machine 110. The DMA buffer may be used by the PCI device to directly transfer input data to virtual machine 110 and/or directly transfer output data from virtual machine 110. The virtual PCI device may include an input/output memory management unit (IOMMU) to manage address translations. The IOMMU is a memory management unit (MMU) that resides on the input/output (I/O) path connecting a device to the memory and manages address translations. The IOMMU brokers an incoming DMA request on behalf of an I/O device by translating the virtual address referenced by the I/O device to a physical address similarly to the translation process performed by the MMU of a CPU.

I/O translation table generating component 122 may generate I/O translation table 124. A translation table (e.g., a page table) is a data structure used by a hypervisor to store a mapping of addresses of guest memory to addresses of hypervisor memory. In an example, hypervisor 120B may use the I/O translation table 124 to store a mapping of I/O port addresses of the guest memory to I/O port addresses of hypervisor memory 126B. The I/O port addresses may be associated with the virtual device 128. For example, hypervisor 120B may generate virtual device 128 and pass virtual device 128 to virtual machine 110A. Hypervisor 120B may then map an I/O port address of hypervisor memory 126B that is associated with virtual device 128 to an I/O port address of virtual machine 110A that is associated with virtual device 128. Accordingly, address translation is handled using I/O translation table 124.

Each I/O translation table entry of the I/O translation table 124B may further be associated with a Level 1 VM context (e.g., virtual machine 110D context), which is a minimal set of data used by a task (e.g., a process, thread, fiber, etc.) that is saved to allow a task to be interrupted, and later be continued at the same point. Responsive to an access request, by virtual machine(s) 110A-C, to the I/O port address of virtual device 128, a VMExit event is triggered (e.g., ioeventfd) and by virtual machine(s) 110A-C may temporarily exit to Hypervisor 120A. Hypervisor 120A may then look up a location of the virtual device I/O port using I/O translation table 124 and, using the associated Level 1 VM context, switch directly switch to hypervisor 120B to process the access request. If the virtual device I/O port is marked missing, hypervisor 120A may signal an I/O port fault.

I/O translation table 124 may include one or more page table such as a protected guest page table or an unprotected guest page table. In an example, I/O translation table 124 may be an extended page table ("EPT"), translating guest physical addresses to hypervisor physical addresses (e.g., Level 2 guest physical addresses to Level 1 guest physical addresses). In another example, I/O translation table 124 may be a shadow page table translating the Level 2 guest virtual addresses to Level 1 guest physical addresses. The I/O translation table 124 may be generated during an initialization of hypervisor 120B, during a configuration change event (e.g., a virtual device is added, a virtual device is removed, etc.), or during any other event.

Hypervisor 120B may indicate a location (in hypervisor memory 126B) of I/O translation table 124 to hypervisor 120A. Hypervisor 120A may map this location to context switch table 121. The I/O translation table 124 may be visible to hypervisors at all levels (e.g., Level 0 hypervisor, Level 1 hypervisor(s), Level 2 hypervisor(s), etc.) For example, the I/O translation table 124B may be stored in a model-specific register (MSR) of a CPU.

Hardware devices 130 may provide hardware resources and functionality for performing computing tasks. Hardware devices 130 may include one or more physical storage devices 132, one or more physical processing devices 134, other computing devices, or a combination thereof. One or more of hardware devices 130 may be split up into multiple separate devices or consolidated into one or more hardware devices. Some of the hardware device shown may be absent from hardware devices 130 and may instead be partially or completely emulated by executable code.

Physical storage devices 132 may include any data storage device that is capable of storing digital data and may include volatile or non-volatile data storage. Volatile data storage (e.g., non-persistent storage) may store data for any duration of time but may lose the data after a power cycle or loss of power. Non-volatile data storage (e.g., persistent storage) may store data for any duration of time and may retain the data beyond a power cycle or loss of power. In one example, physical storage devices 132 may be physical memory and may include volatile memory devices (e.g., random access memory (RAM)), non-volatile memory devices (e.g., flash memory, NVRAM), and/or other types of memory devices. In another example, physical storage devices 132 may include one or more mass storage devices, such as hard drives, solid state drives (SSD)), other data storage devices, or a combination thereof. In a further example, physical storage devices 132 may include a combination of one or more memory devices, one or more mass storage devices, other data storage devices, or a combination thereof, which may or may not be arranged in a cache hierarchy with multiple levels.

Physical processing devices 134 may include one or more processors that are capable of executing the computing tasks. Physical processing devices 134 may be a single core processor that is capable of executing one instruction at a time (e.g., single pipeline of instructions) or may be a multi-core processor that simultaneously executes multiple instructions. The instructions may encode arithmetic, logical, or I/O operations. In one example, physical processing devices 134 may be implemented as a single integrated circuit, two or more integrated circuits, or may be a component of a multi-chip module (e.g., in which individual microprocessor dies are included in a single integrated circuit package and hence share a single socket). A physical processing device may also be referred to as a central processing unit ("CPU").

Network 140 may be a public network (e.g., the internet), a private network (e.g., a local area network (LAN), a wide area network (WAN)), or a combination thereof. In one example, network 140 may include a wired or a wireless infrastructure, which may be provided by one or more wireless communications systems, such as a wireless fidelity (WiFi) hotspot connected with the network 140 and/or a wireless carrier system that can be implemented using various data processing equipment, communication towers, etc.

Figure 2:
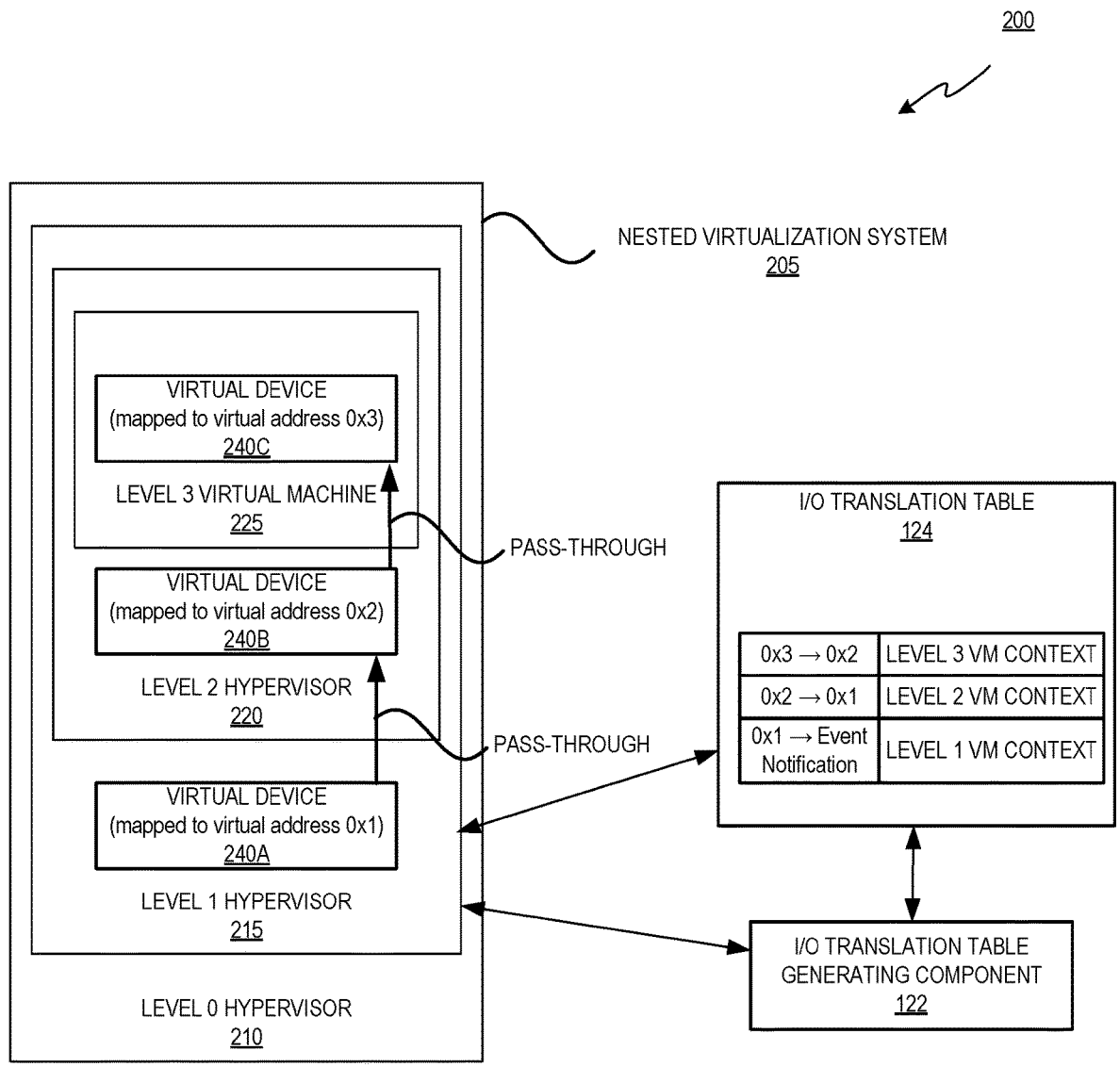
FIG. 2 depicts a block diagram illustrating components of an example nested virtualization computer system performing pass-through of a virtual device, in accordance with one or more aspects of the present disclosure.

FIG. 2 is a block diagram illustrating example components and modules of computer system 200, in accordance with one or more aspects of the present disclosure. Computer system 200 may comprise executable code that implements one or more of the components and modules and may be implemented within a hypervisor, a host operating system, a guest operating system, hardware firmware, or a combination thereof. In the example shown, computer system 200 may include nested virtualization system 205, I/O translation table 124, and I/O translation table generating component 122.

Nested virtualization system 205 may include Level 0 hypervisor 210, which may manage a Level 1 virtual machine running Level 1 hypervisor 215. Level 1 hypervisor 215 may manage a Level 2 virtual machine running Level 2 hypervisor 220. Level 2 hypervisor 220 may manage Level 3 virtual machine 225. Level 1 hypervisor 215 may create virtual device 240A (via device driver 127), which may be mapped to a Level 1 guest virtual address of a Level 1 address space associated with the Level 1 virtual machine. By way of example, virtual device 240A may be mapped to Level 1 guest virtual address "0x1." Level 1 hypervisor 215 may then pass-through virtual device 240A (now virtual device 240B) to Level 2 hypervisor 220, which may be mapped to a Level 2 guest virtual address of a Level 2 address space associated with the Level 2 virtual machine. By way of example, virtual device 240B may be mapped to Level 2 guest virtual address "0x2." Level 2 hypervisor 220 may then pass-through virtual device 240B (now virtual device 240C) to Level 3 virtual machine 225, which may be mapped to a Level 3 guest virtual address of a Level 3 address space associated with the Level 3 virtual machine. By way of example, virtual device 240C may be mapped to Level 3 guest virtual address "0x3."

I/O translation table generating component 122 may enable computer system 200 to generate I/O translation table 124 to provide event notification support for nested virtualization system 205. I/O translation table generating component 122 may generate I/O translation table 124 during initialization of any component of nested virtualization system 205 (e.g., initialization of Level 0 hypervisor 210, initialization of level 1 hypervisor 215, etc.), during a configuration change event (e.g., generation of virtual device 240A, pass-through of virtual device 240A, etc.), or during any other event. As the virtual device is "passed-through" to a higher level of the VM hierarchy, I/O port virtual addresses of the virtual device are mapped in I/O translation table 124. As shown, in a first I/O translation table entry, Level 3 guest virtual address "0x3" is mapped to Level 2 guest virtual address "0x2," and the first I/O translation table entry is associated with Level 3 virtual machine context. In a second I/O translation table entry, Level 2 guest virtual address "0x2" is mapped to Level 1 guest virtual address "0x1," and the second I/O translation table entry is associated with Level 2 virtual machine context. In a third I/O translation table entry, Level 1 guest virtual address "0x1" is mapped to an event notification (e.g., ioeventfd) and the third I/O translation table entry is associated with Level 1 virtual machine context.

Responsive to the an access request, by Level 3 virtual machine 225, to the I/O port address of virtual device 240C (e.g., "0x3"), a VMExit event is triggered (e.g., ioeventfd) and Level 3 virtual machine 225 temporarily exits to Level 0 hypervisor 210. Level 0 hypervisor 210 may then look up a location of the virtual device 240C I/O port using I/O translation table 124. For example, Level 0 hypervisor 210 may look up virtual address "0x3," which is mapped to virtual address "0x2." The Level 0 hypervisor 210 may then look up virtual address "0x2," which is mapped to virtual address "0x1." The Level 0 hypervisor 210 may then look up virtual address "0x," which is mapped to the virtual address relating to the event notification. Accordingly, the Level 0 hypervisor 210 may look up the context associated with the event notification table entry, and direct the CPU to switch (e.g., by a VMEnter instruction) to the Level 1 virtual machine. Accordingly, the access request by Level 3 virtual machine 225 results in the Level 0 hypervisor 210 switching directly to the level maintaining the virtual device. Once the access request is processed, the CPU can switch back to Level 3 virtual machine.

In some embodiments, Level 0 hypervisor 210 may cache and/or store in hypervisor memory the above described process (partially or fully). For example, responsive to receiving another access request, by Level 3 virtual machine 225, to the I/O port address of virtual device 240C (e.g., "0x3"), the Level 0 hypervisor 210 may direct the CPU to switch to the Level 1 virtual machine without needing to perform multiple translations from virtual address "0x3" to the "event notification" mapping. In some embodiments, the translations ("from virtual address "0x3" to the "event notification" mapping") can be performed by a nested hypervisor (e.g., Level 1 hypervisor 215, Level 2 hypervisor 220, etc.) and forwarded to, as well as stored by, Level 0 hypervisor 210.

Figure 3:
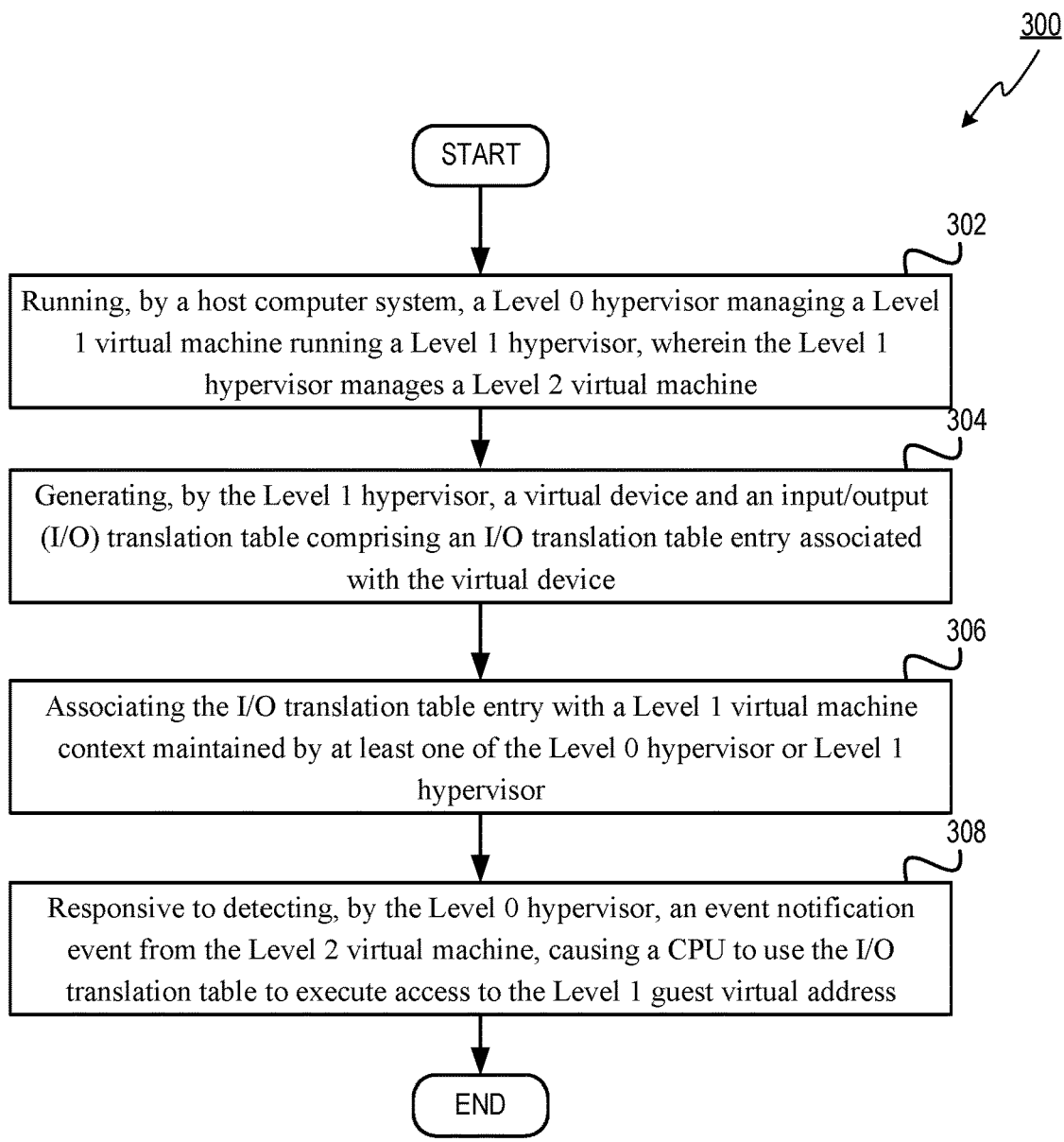
FIG. 3 depicts a block diagram illustrating an example memory translation, in accordance with one or more aspects of the present disclosure.

FIG. 3 depicts a flow diagram of an illustrative example of a method 300 for providing event notification support in a nested virtualization environment, in accordance with one or more aspects of the present disclosure. Method 300 and each of its individual functions, routines, subroutines, or operations may be performed by one or more processors of the computer device executing the method. In certain implementations, method 300 may be performed by a single processing thread. Alternatively, method 300 may be performed by two or more processing threads, each thread executing one or more individual functions, routines, subroutines, or operations of the method. In an illustrative example, the processing threads implementing method 300 may be synchronized (e.g., using semaphores, critical sections, and/or other thread synchronization mechanisms). Alternatively, the processes implementing method 300 may be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 300 may be performed by a kernel of a hypervisor as shown in FIG. 1 or by an executable code of a host machine (e.g., host operating system or firmware), a virtual machine (e.g., guest operating system or virtual firmware), other executable code, or a combination thereof.

Method 300 may be performed by processing devices of a server device or a client device and may begin at block 302. In block 302, a host computer system may run a Level 0 hypervisor managing a Level 1 virtual machine running a Level 1 hypervisor. The Level 1 hypervisor may manage a Level 2 virtual machine.

At block 304, the Level 1 hypervisor may generate a virtual device and an I/O translation table. The I/O table may include an I/O translation table entry associated with the virtual device. The I/O translation table entry may map a Level 2 guest virtual address of a Level 2 address space associated with the Level 2 virtual machine to a corresponding Level 1 guest virtual address of a Level 1 address space associated with the Level 1 virtual machine. The I/O translation table may be generated during an initialization of the Level 0 hypervisor, the Level 1 hypervisor, during a configuration change event (e.g., generation of the virtual device, pass-through of the virtual device), or during any other event. In some embodiments, the I/O translation table may be made accessible to hypervisors at each privilege level (e.g., the Level 0 hypervisor, the Level 1 hypervisor, etc.). In some embodiments, the I/O translation table is stored in a model-specific register (MSR).

At block 306, the Level 1 hypervisor may associate the I/O translation table entry with a Level 1 virtual machine context maintained by the Level 1 hypervisor and/or the Level 0 hypervisor. At block 308, responsive to detecting, by the Level 0 hypervisor, an event notification (e.g., a signal triggered by access to a predefined I/O resource) from the Level 2 virtual machine, the Level 0 hypervisor may cause a central processing unit (CPU) to use the I/O translation table to execute access to the Level 1 guest virtual address.

The Level 0 hypervisor may cache, in a dedicate memory buffer, address translations that are performed by the Level 0 hypervisor and associated with the I/O translation table. In some embodiments, the Level 1 hypervisor may perform address translations using the I/O translation table responsive to detecting an event notification, and send the address translations to the Level 0 hypervisor. Responsive to completing the operations described herein above with references to block 308, the method may terminate.

Figure 4:
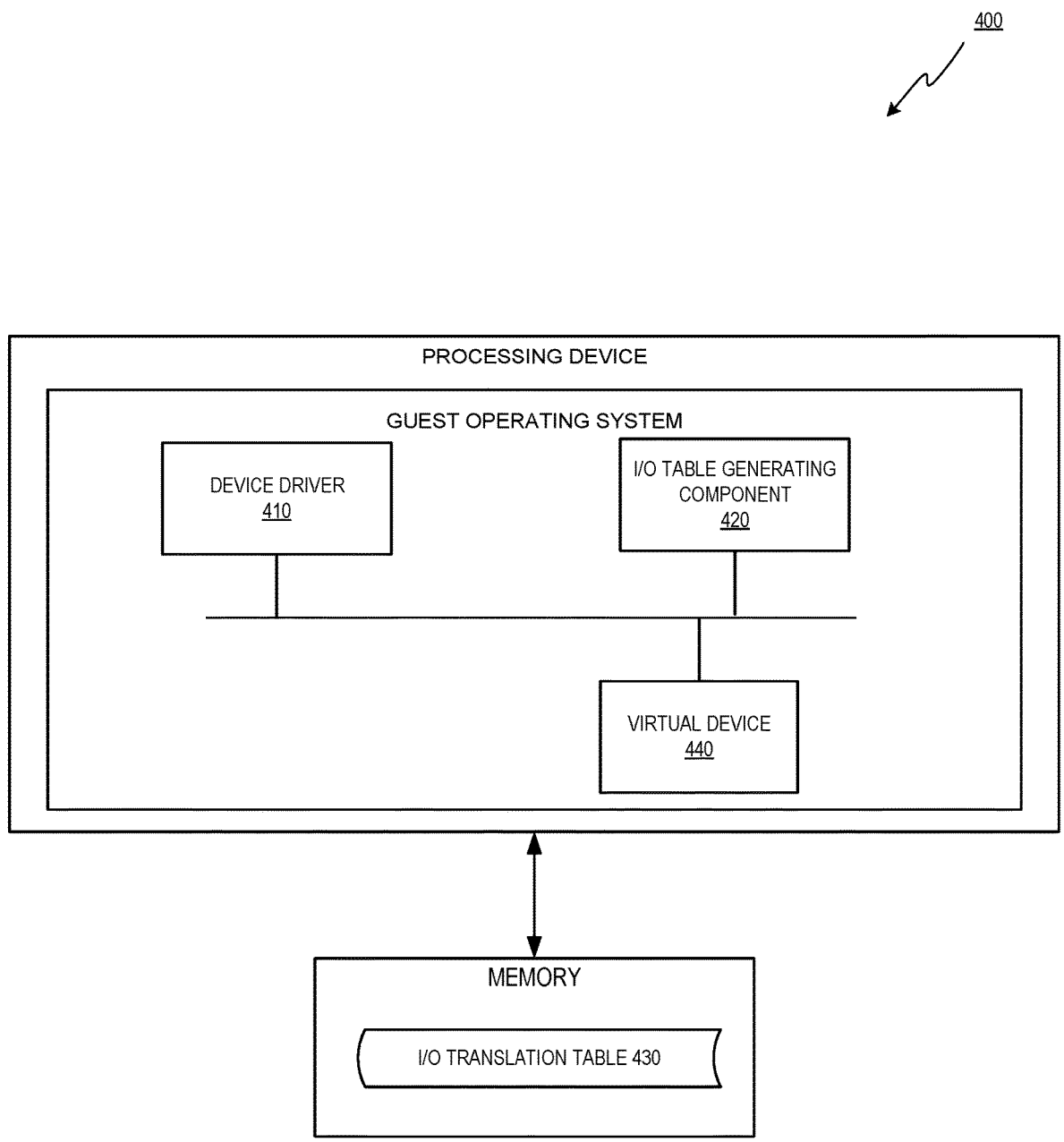
FIG. 4 depicts a block diagram of an example computer system in accordance with one or more aspects of the present disclosure.

FIG. 4 depicts a block diagram of a computer system 400 operating in accordance with one or more aspects of the present disclosure. Computer system 400 may be the same or similar to computer system 200 and computing system 100 and may include one or more processing devices and one or more memory devices. In the example shown, computer system 400 may include a device driver 410, an I/O translation table generating component 420, a I/O translation table 430, and a virtual device 440.

The processing device may run a Level 0 hypervisor that may manage a Level 1 virtual machine running a Level 1 hypervisor. The Level 1 hypervisor may manage a Level 2 virtual machine.

Device driver 410 may generate, by the Level 1 hypervisor, a virtual device. I/O translation table generating component 420 may generate, by the Level 1 hypervisor, an I/O translation table. The I/O table may include an I/O translation table entry associated with the virtual device. The I/O translation table entry may map a Level 2 guest virtual address of a Level 2 address space associated with the Level 2 virtual machine to a corresponding Level 1 guest virtual address of a Level 1 address space associated with the Level 1 virtual machine. The I/O translation table may be generated during an initialization of the Level 0 hypervisor, the Level 1 hypervisor, during a configuration change event (e.g., generation of the virtual device, pass-through of the virtual device), or during any other event. In some embodiments, the I/O translation table may be made accessible to hypervisors at each privilege level (e.g., the Level 0 hypervisor, the Level 1 hypervisor, etc.). In some embodiments, the I/O translation table is stored in a model-specific register (MSR).

The Level 1 hypervisor may associate the I/O translation table entry with a Level 1 virtual machine context maintained by the Level 1 hypervisor and/or the Level 0 hypervisor. Responsive to detecting, by the Level 0 hypervisor, an event notification (e.g., a signal triggered by access to a predefined I/O resource) from the Level 2 virtual machine, the Level 0 hypervisor may cause a central processing unit (CPU) to use the I/O translation table 430 to execute access to the Level 1 guest virtual address. The Level 0 hypervisor may cache, in a dedicate memory buffer, address translations that are performed by the Level 0 hypervisor and associated with the I/O translation table. In some embodiments, the Level 1 hypervisor may perform address translations using the I/O translation table responsive to detecting an event notification, and send the address translations to the Level 0 hypervisor.

Figure 5:
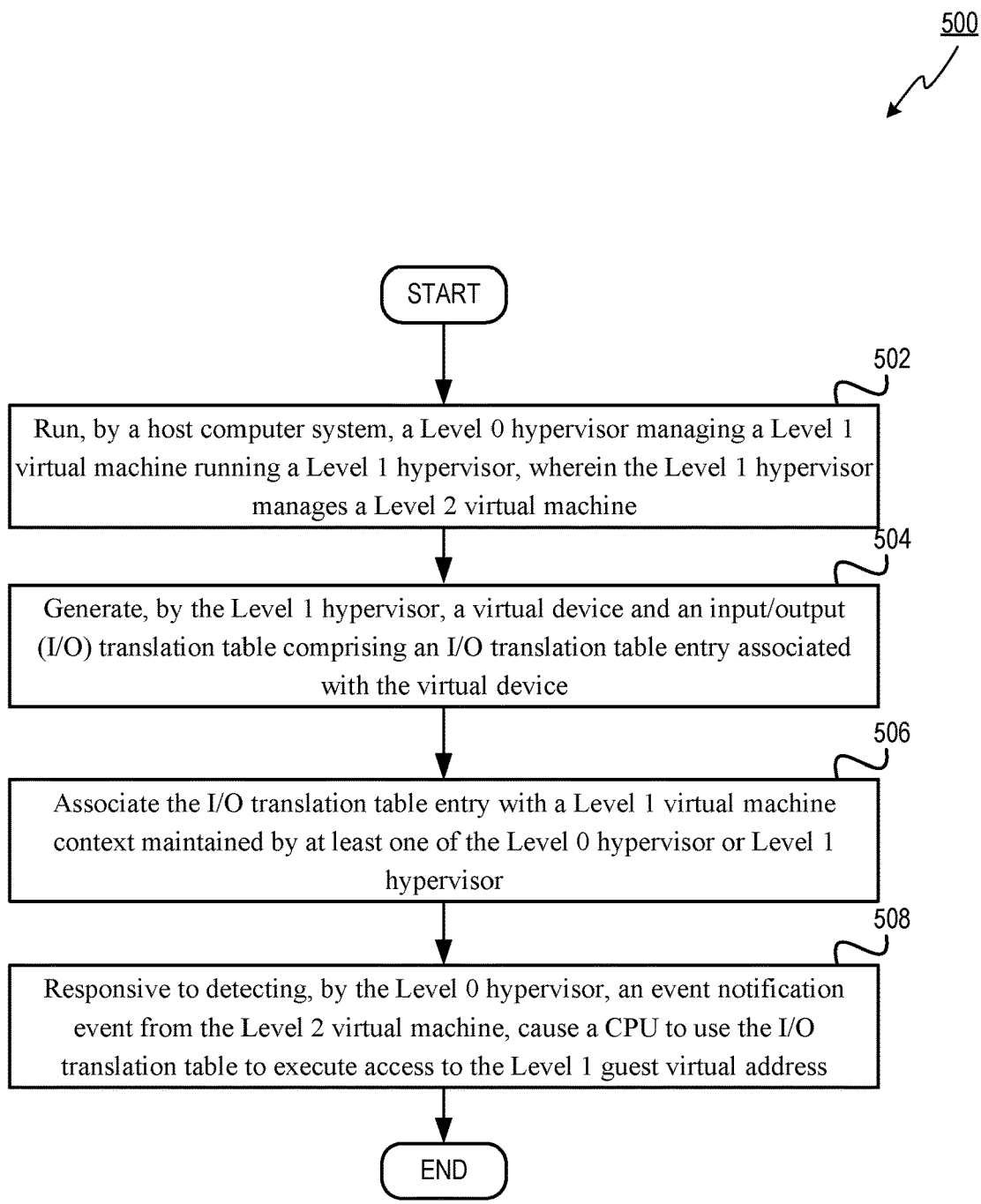
FIG. 5 depicts a flow diagram of another example method for providing event notification support in a nested virtualization environment, in accordance with one or more aspects of the present disclosure.

FIG. 5 depicts a flow diagram of one illustrative example of a method 500 for providing event notification support in a nested virtualization environment, in accordance with one or more aspects of the present disclosure. Method 500 may be similar to method 300 and may be performed in the same or a similar manner as described above in regards to method 300. Method 500 may be performed by processing devices of a server device or a client device and may begin at block 502.

At block 502, the processing device may run a Level 0 hypervisor that may run a Level 1 virtual machine managing a Level 1 hypervisor. The Level 1 hypervisor may manage a Level 2 virtual machine.

At block 504, the processing device may generate, by the Level 1 hypervisor, a virtual device and an I/O translation table. The I/O table may include an I/O translation table entry associated with the virtual device. The I/O translation table entry may map a Level 2 guest virtual address of a Level 2 address space associated with the Level 2 virtual machine to a corresponding Level 1 guest virtual address of a Level 1 address space associated with the Level 1 virtual machine. The I/O translation table may be generated during an initialization of the Level 0 hypervisor, the Level 1 hypervisor, during a configuration change event (e.g., generation of the virtual device, pass-through of the virtual device), or during any other event. In some embodiments, the I/O translation table may be made accessible to hypervisors at each privilege level (e.g., the Level 0 hypervisor, the Level 1 hypervisor, etc.). In some embodiments, the I/O translation table is stored in a model-specific register (MSR).

At block 506, the processing device may associate the I/O translation table entry with a Level 1 virtual machine context maintained by the Level 1 hypervisor and/or the Level 0 hypervisor. At block 508, responsive to detecting, by the Level 0 hypervisor, an event notification (e.g., a signal triggered by access to a predefined I/O resource) from the Level 2 virtual machine, the processing device may cause a central processing unit (CPU) to use the I/O translation table to execute access to the Level 1 guest virtual address.

The Level 0 hypervisor may cache, in a dedicate memory buffer, address translations that are performed by the Level 0 hypervisor and associated with the I/O translation table. In some embodiments, the Level 1 hypervisor may perform address translations using the I/O translation table responsive to detecting an event notification, and send the address translations to the Level 0 hypervisor. Responsive to completing the operations described herein above with references to block 508, the method may terminate.

Figure 6:
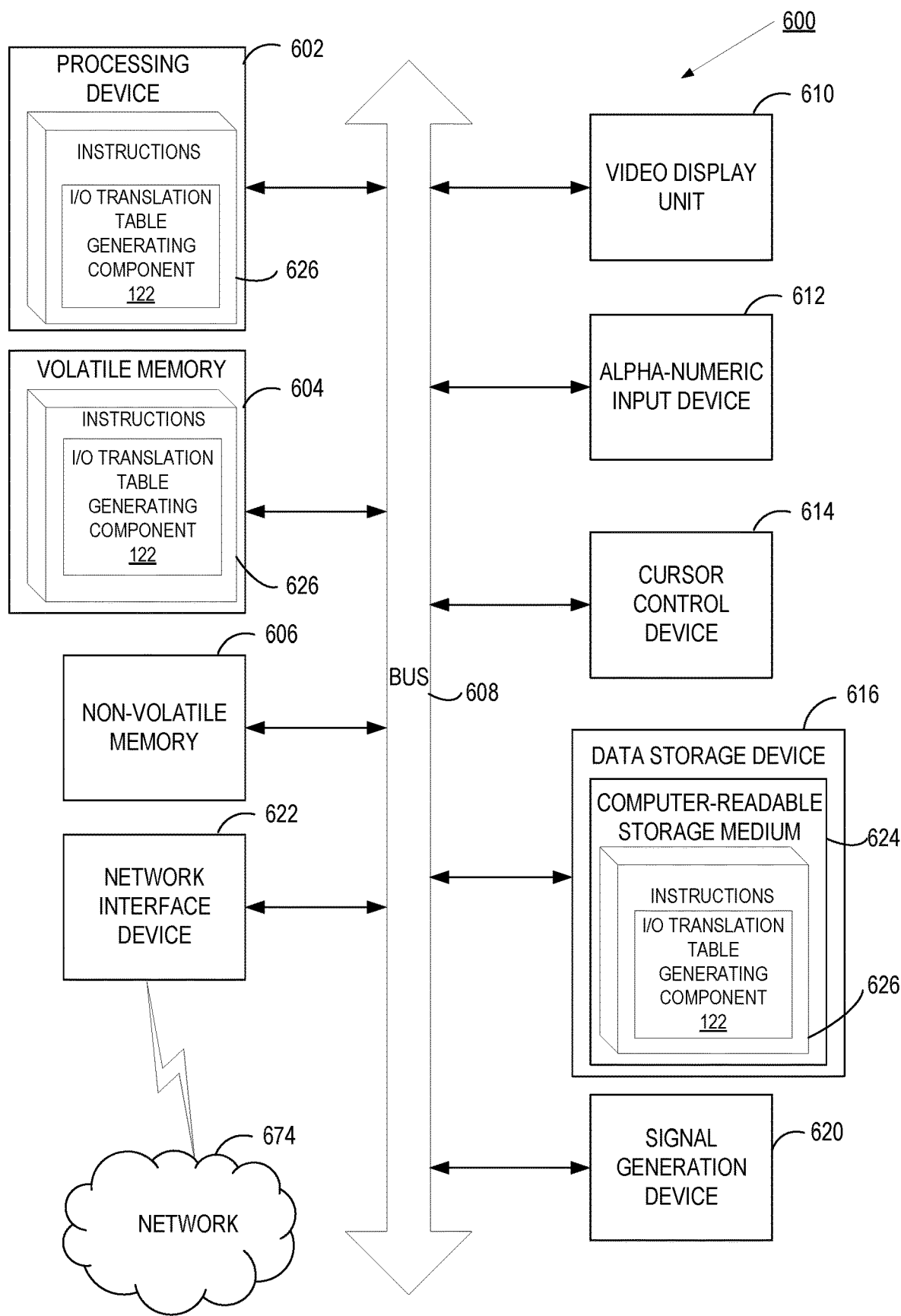
FIG. 6 depicts a block diagram of an illustrative computing device operating in accordance with the examples of the present disclosure.

FIG. 6 depicts a block diagram of a computer system operating in accordance with one or more aspects of the present disclosure. In various illustrative examples, computer system 600 may correspond to computing system 100 of FIG. 1 or computer system 200 of FIG. 2. The computer system may be included within a data center that supports virtualization. Virtualization within a data center results in a physical system being virtualized using virtual machines to consolidate the data center infrastructure and increase operational efficiencies. A virtual machine (VM) may be a program-based emulation of computer hardware. For example, the VM may operate based on computer architecture and functions of computer hardware resources associated with hard disks or other such memory. The VM may emulate a physical computing environment, but requests for a hard disk or memory may be managed by a virtualization layer of a computing device to translate these requests to the underlying physical computing hardware resources. This type of virtualization results in multiple VMs sharing physical resources.

In certain implementations, computer system 600 may be connected (e.g., via a network, such as a Local Area Network (LAN), an intranet, an extranet, or the Internet) to other computer systems. Computer system 600 may operate in the capacity of a server or a client computer in a client-server environment, or as a peer computer in a peer-to-peer or distributed network environment. Computer system 600 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 600 may include a processing device 602, a volatile memory 604 (e.g., random access memory (RAM)), a non-volatile memory 606 (e.g., read-only memory (ROM) or electrically-erasable programmable ROM (EEPROM)), and a data storage device 616, which may communicate with each other via a bus 608.

Processing device 602 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 600 may further include a network interface device 622. Computer system 600 also may include a video display unit 610 (e.g., an LCD), an alphanumeric input device 612 (e.g., a keyboard), a cursor control device 614 (e.g., a mouse), and a signal generation device 620.

Data storage device 616 may include a non-transitory computer-readable storage medium 624 on which may store instructions 626 encoding any one or more of the methods or functions described herein, including instructions for implementing methods 300 or 500 and for I/O translation table generating component 122 and components illustrated in FIGS. 1 and 2.

Instructions 626 may also reside, completely or partially, within volatile memory 604 and/or within processing device 602 during execution thereof by computer system 600, hence, volatile memory 604 and processing device 602 may also constitute machine-readable storage media.

While computer-readable storage medium 624 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "initiating," "transmitting," "receiving," "analyzing," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 300 or 500 and one or more of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
    running, by a host computer system, a Level 0 hypervisor managing a Level 1 virtual machine running a Level 1 hypervisor, wherein the Level 1 hypervisor manages a Level 2 virtual machine,
    generating, by the Level 1 hypervisor, in response to a configuration change event, a virtual device and an input/output (I/O) translation table comprising an I/O translation table entry associated with the virtual device, wherein the I/O translation table entry maps a Level 2 guest virtual address of a Level 2 address space associated with the Level 2 virtual machine to a corresponding Level 1 guest virtual address of a Level 1 address space associated with the Level 1 virtual machine;
    associating the I/O translation table entry with a Level 1 virtual machine context maintained by at least one of the Level 0 hypervisor or Level 1 hypervisor; and
    responsive to detecting, by the Level 0 hypervisor, an event notification from the Level 2 virtual machine, causing a central processing unit (CPU) to use the I/O translation table to execute access to the Level 1 guest virtual address.

2. The method of claim 1, wherein the I/O translation table is accessible to the Level 0 hypervisor and the Level 1 hypervisor.

3. The method of claim 1, wherein the I/O translation table is stored in a model-specific register (MSR).

4. The method of claim 1, further comprising:
    caching, in a dedicated memory buffer, address translations that are performed by the Level 0 hypervisor associated with the I/O translation table.

5. The method of claim 1, further comprising:
    responsive to detecting an event notification, performing, by the Level 1 hypervisor, an address translation using the I/O translation table; and
    sending the address translation to the Level 0 hypervisor.

6. The method of claim 1, wherein the event notification comprises a signal triggered by access to a predefined I/O resource.

7. A system, comprising:
    a memory;
    a processing device operatively coupled to the memory, the processing device configured to:
        run a Level 0 hypervisor managing a Level 1 virtual machine running a Level 1 hypervisor, wherein the Level 1 hypervisor manages a Level 2 virtual machine,
        generate, by the Level 1 hypervisor, in response to a configuration change event, a virtual device and an input/output (I/O) translation table comprising an I/O translation table entry associated with the virtual device, wherein the I/O translation table entry maps a Level 2 guest virtual address of a Level 2 address space associated with the Level 2 virtual machine to a corresponding Level 1 guest virtual address of a Level 1 address space associated with the Level 1 virtual machine;
        associate the I/O translation table entry with a Level 1 virtual machine context maintained by at least one of the Level 0 hypervisor or Level 1 hypervisor; and
        responsive to detecting, by the Level 0 hypervisor, an event notification from the Level 2 virtual machine, cause a central processing unit (CPU) to use the I/O translation table to execute access to the Level 1 guest virtual address.

8. The system of claim 7, wherein the I/O translation table is accessible to the Level 0 hypervisor and the Level 1 hypervisor.

9. The system of claim 7, wherein the I/O translation table is stored in a model-specific register (MSR).

10. The system of claim 7, further comprising the processing device configured to:

cache, in a dedicated memory buffer, address translations that are performed by the Level 0 hypervisor associated with the I/O translation table.

11. The system of claim 7, further comprising the processing device configured to:
responsive to detecting an event notification, perform, by the Level 1 hypervisor, an address translation using the I/O translation table; and
send the address translation to the Level 0 hypervisor.

12. The system of claim 7, wherein the event notification comprises a signal triggered by access to a predefined I/O resource.

13. A non-transitory machine-readable storage medium storing executable instructions that, when executed by a processing device, cause the processing device to:
run a Level 0 hypervisor managing a Level 1 virtual machine running a Level 1 hypervisor, wherein the Level 1 hypervisor manages a Level 2 virtual machine,
generate, by the Level 1 hypervisor, in response to a configuration change event, a virtual device and an input/output (I/O) translation table comprising an I/O translation table entry associated with the virtual device, wherein the I/O translation table entry maps a Level 2 guest virtual address of a Level 2 address space associated with the Level 2 virtual machine to a corresponding Level 1 guest virtual address of a Level 1 address space associated with the Level 1 virtual machine;
associate the I/O translation table entry with a Level 1 virtual machine context maintained by at least one of the Level 0 hypervisor or Level 1 hypervisor; and
responsive to detecting, by the Level 0 hypervisor, an event notification from the Level 2 virtual machine, cause a central processing unit (CPU) to use the I/O translation table to execute access to the Level 1 guest virtual address.

14. The non-transitory machine-readable storage medium of claim 13, wherein the I/O translation table is accessible to the Level 0 hypervisor and the Level 1 hypervisor.

15. The non-transitory machine-readable storage medium of claim 13, wherein the I/O translation table is stored in a model-specific register (MSR).

16. The non-transitory machine-readable storage medium of claim 13, further comprising the processing device configured to:
cache, in a dedicated memory buffer, address translations that are performed by the Level 0 hypervisor associated with the I/O translation table.

17. The non-transitory machine-readable storage medium of claim 13, further comprising the processing device configured to:
responsive to detecting an event notification, perform, by the Level 1 hypervisor, an address translation using the I/O translation table; and
send the address translation to the Level 0 hypervisor.

* * * * *